(12) United States Patent
Reumann et al.

(10) Patent No.: US 9,083,735 B2
(45) Date of Patent: Jul. 14, 2015

(54) METHOD AND APPARATUS FOR DETECTING COMPUTER FRAUD

(75) Inventors: John Reumann, Croton on Hudson, NY (US); Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 13/571,745

(22) Filed: Aug. 10, 2012

(65) Prior Publication Data

US 2012/0304295 A1    Nov. 29, 2012

Related U.S. Application Data

(62) Division of application No. 11/623,516, filed on Jan. 16, 2007.

(51) Int. Cl.
*G06F 21/00* (2013.01)
*H04L 29/06* (2006.01)

(52) U.S. Cl.
CPC ........ *H04L 63/1441* (2013.01); *H04L 63/1483* (2013.01)

(58) Field of Classification Search
CPC ............ H04L 63/1483; H04L 63/1441; H04L 63/1466
USPC .................................................... 726/22, 25
See application file for complete search history.

(56) References Cited

U.S. PATENT DOCUMENTS

| 4,468,809 | A | 8/1984 | Grabowski et al. |
| 6,813,645 | B1 | 11/2004 | Meyer |
| 7,366,339 | B2 * | 4/2008 | Douglas et al. ............... 382/137 |
| 2002/0143814 | A1 | 10/2002 | Hepworth et al. |
| 2003/0053420 | A1 | 3/2003 | Duckett et al. |
| 2004/0123157 | A1 | 6/2004 | Alagna et al. |
| 2006/0080735 | A1 | 4/2006 | Brinson et al. ................... 726/22 |
| 2006/0179315 | A1 | 8/2006 | Sasage et al. |
| 2007/0068402 | A1 * | 3/2007 | Sanchez et al. ............ 101/93.42 |
| 2007/0214151 | A1 * | 9/2007 | Thomas et al. .................. 707/10 |
| 2008/0046738 | A1 | 2/2008 | Galloway et al. ............. 713/176 |
| 2009/0094677 | A1 * | 4/2009 | Pietraszek et al. ................ 726/2 |

FOREIGN PATENT DOCUMENTS

| EP | 1 681 825 A1 | 7/2006 |
| JP | 2006-221242 A | 8/2006 |

(Continued)

OTHER PUBLICATIONS

A Robust Method for TV Logo Tracking in Video Streams, Wang et al, IEEE, Jul. 9-12, 2006.*

(Continued)

*Primary Examiner* — Luu Pham
*Assistant Examiner* — Jahangir Kabir
(74) *Attorney, Agent, or Firm* — Ryan, Mason & Lewis, LLP

(57) ABSTRACT

Techniques are provided for automatically generating a database of destinations to be protected against computer fraud. The techniques include generating at least one category of destinations to be protected, and retrieving (i) at least one list of destinations belonging to said at least one category and (ii) contents specified at each uniform resource locator associated with a destination identified in the at least one list of destinations belonging to said at least one category.

5 Claims, 3 Drawing Sheets

(56) References Cited

FOREIGN PATENT DOCUMENTS

| WO | WO 2006/018647 A1 | 2/2006 |
|---|---|---|
| WO | WO 2006-026921 A2 | 3/2006 |
| WO | WO 2006/120368 | 11/2006 |

OTHER PUBLICATIONS

Document Segmentation Using Texture Variance and Low Resolution Images, Murguiu, Mario I. Chucon. IEEE, Apr. 5-7, 1998.*

Netcraft Anti-Phishing Toolbar; http://toolbar.netcraft.com.

Oracle E-Business Suite Technology. In-Depth: Using Single Sign-On 10g with E-Business Suite Release 11i by Steven Chan, dated May 2, 2006; http://blogs.oracle.com/schan/2006/02.

U.S. Appl. No. 11/505,223, filed Aug. 16, 2006.

Phishing—Wikipedia, the free encyclopedia, downloaded from website http://en.wikipedia.org/wiki/Phishing on Jan. 8, 2007.

"Microsoft Adds Anti-phishing Tools to IE 7" by Matt Hines, Sep. 5, 2006; downloaded from http://www.eweek.com/article2/0,1895,2012237,00.asp on Jan. 8, 2007.

"Firefox 2.0 Bakes in Anti-Phish Antidote by Sean Michael Kerner", May 30, 2006; downloaded from http://www.internetnews.com/dev-news/article.php/3609816 on Jan. 8, 2007.

"Protect Against Internet Phishing Scams", downloaded from http://www.phishguard.com/ on Jan. 8, 2007.

Anti-Phishing Working Group; Website Hosting Courtesy GeoTrust; Resources; downloaded from http://www.antiphishing.org/solutions.html on Jan. 8, 2007.

CallingID Toolbar download and review—anti-phishing browser add-on from SnapFiles; http://www.snapfiles.com/get/callingid.html on Jan. 8, 2007.

NetGeo—The Internet Geographic Database; downloaded from http://www.caida.org/tools/utilities/netgeo/ on Jan. 8, 2007.

Kawauchi et al., "An anti-phishing technique using whois service," Proceedings (3) of the 67th 2005 National Conf. on Database and Media/Network, Japan, Information Processing Society of Japan, pp. 337-338 (translation of relevant portion attached) (Mar. 2, 2005).

* cited by examiner

METHOD AND APPARATUS FOR DETECTING COMPUTER FRAUD

CROSS-REFERENCE TO RELATED APPLICATIONS

This application is a divisional of U.S. patent application Ser. No. 11/623,516, filed Jan. 16, 2007, incorporated by reference herein.

FIELD OF THE INVENTION

The present invention generally relates to information technology, and, more particularly, to a method and apparatus for detecting computer fraud.

BACKGROUND OF THE INVENTION

When a user receives an e-mail or other communication which appears to contain a link to web site "A," but is redirected to an impersonated version of web site "A," the user is said to be the subject of a web site "phishing" attack. Users would like to know whether a site that they are visiting is a well-known, legitimate site, or a site that looks like a legitimate site but is not located at the same location as the expected legitimate version of the web site.

A user may initiate a transfer of a web page into a browser by typing the URL, following a link, following a link embedded in an email or an instant messaging session, or via a redirect from another page. As a result, the browser will resolve the protocol to be used to look up the destination page, contact the domain name system (DNS) to resolve the destination host, connect to the internet protocol (IP) address named by the DNS look-up, download the page content, render the page and simultaneously execute any embedded scripts where appropriate. The content of this page can be forged in many ways.

There are known browser tool bars that merely extract the uniform resource locator (URL) from the web browser and normalize it to present to the user the effective site to which he or she is connected. While this may eliminate attacks in which a URL overfills the browser location window by reducing the site name, it does not solve the problem in which two very similar-looking domain names are being used. Since the information about effective sites is fairly coarse, it is possible for an attacker to get a closely looking domain name in the same geography (e.g. United States) and then try to confuse such phishing detectors. Furthermore, with increasing globalization, it is quite likely, for example, that a legitimate site for a U.S.-based bank is located in another country such as, for example, India or Brazil, which makes for several false alarms. Using the known techniques, the user would still be lead to believe that he or she is contacting the correct web site. The known techniques rely on the user to check the domain name for every visited web site. Furthermore, the known techniques only extract the information delivered in the actual URL, and therefore, these techniques are not safe in the case of DNS poisoning attacks, in which the actual domain names are forced to resolve to a subverted site IP address that is different from the target that the user intended when he or she typed the name into the browser location bar.

It would thus be desirable to overcome the limitations in previous approaches.

SUMMARY OF THE INVENTION

Principles of the present invention provide techniques for detecting computer fraud. An exemplary method (which can be computer-implemented) for detecting computer fraud, according to one aspect of the invention, can include steps of obtaining a text version of a candidate destination and a graphical rendering of the candidate destination, comparing the text version and graphical rendering of the candidate destination with a corresponding text version and a corresponding graphical rendering of a stored destination, and generating a fraud warning if the graphical rendering of the candidate destination is substantially similar to the graphical rendering of the stored destination while the text version of the candidate destination differs substantially from the corresponding text version of the stored destination.

In one aspect of the invention, the candidate destination and stored destination are represented as URLs. Also, in another aspect of the invention, the techniques for detecting computer fraud are automatically executed upon loading a web page associated with a candidate destination. The techniques may also be executed by using a button that is shown to a user in at least one of a window and a status bar external to a browser window associated with the candidate destination. Furthermore, in another aspect of the invention, a fraud warning may be generated via a visual prompt displayed to a user in at least one of a window and a status bar external to a browser window associated with the candidate destination. In yet another aspect of the invention, the candidate destination is identified as clean if all determined organizations match to a corresponding stored organization and if the stored organization is not substantially similar to another organization ranked as more popular in a database. The candidate destination is identified as unknown if visual cues can not be matched to an organization, but for which the candidate destination coincides with a visual URL and destination unlikely to be a phishing destination.

In an embodiment of the invention, an exemplary method of generating a database, or white-list, of destinations to be protected against computer fraud can include the steps of generating at least one category of destinations to be protected, and retrieving at least one list of destinations belonging to the at least one category. In one aspect of the invention, the step of retrieving at least one list of destinations belonging to the at least one category comprises obtaining a first list of destinations and a second list of destinations, and merging the first and second lists of destinations. Also, in another aspect of the invention, the retrieving step comprises accessing an Internet search engine and/or accessing an Internet indexing service.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

At least one embodiment of the invention may provide one or more beneficial technical effects, such as, for example, detecting computer fraud when the candidate or phishing entity comprises a domain name that is very similar-looking to that of an intended or stored entity. Also, at least one embodiment of the invention may provide the beneficial effect of detecting computer fraud in situations in which an intended domain name is forced to resolve to a candidate or phishing destination that is different from the target that a user intended when the user typed the name into the browser location bar.

These and other objects, features and advantages of the present invention will become apparent from the following

DETAILED DESCRIPTION OF PREFERRED EMBODIMENTS

Figure 1:
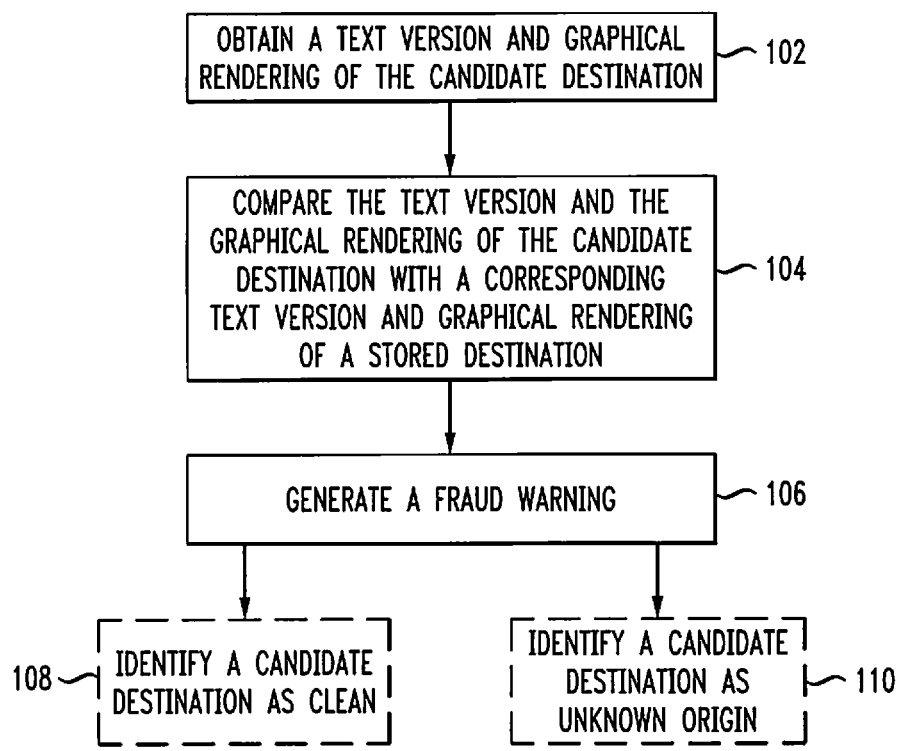
FIG. 1 is a flow diagram illustrating an exemplary method for detecting computer fraud, according to one aspect of the invention.

An embodiment of the invention constructs at least one site signature based on what the user can view in his or her browser window. A software agent that computes these signatures also maintains a database, or a white-list, of well-known graphical and other signatures for websites. Whenever signatures are computed for a site, they are compared against the signatures in the database. If some signatures match those of well-known websites while other signatures are either not registered or match sources of phishing attacks (e.g., certain domain names, IP address ownership), the site phishing score will increase and the browser status bar will present a symbol to indicate the risk of phishing (e.g., <><).

A common form of phishing attacks comprises including a link to a site that appears to be from the web site "A", but in reality points to some other web-site. With rich text and Hypertext Markup Language (HTML) encoding of e-mail, a link may typically be represented using the following syntax or equivalent:

<a href="target link"> Text Displayed to User </a>

In most readers, a user is shown only the string marked "Text Displayed to User", and the "target link" is not shown. While some users may actually examine the link, some effort is made to disguise the link so that the "target link" appears to be somewhat similar to the link to the real site that would be indicated as "Text Displayed to the User". Some examples of this type of masquerading are provided below.

As means of example only, an e-mail may contain an embedded link <a href=http://www.acme1nvestments.com> Acme Investments </a> and it may thus purport to come from the Acme Investments website, http://www.acmeinvestments.com. When the user accesses this link in the browser, he is taken to the site www.acme1nvestments.com. Unless the user is diligent enough to notice that the ninth letter in the URL is a 1 (numeric one) instead of an "i," he or she would mistakenly believe that he/she is at the website of Acme Investments.

A particular insidious case of such impersonation is made possible due to the standards for encoding of characters in multiple languages. This standard, the Internationalized Domain Names allows for representing domain names (the name of the machine in the URL) using uni-code characters in languages other than English. For example, Unicode character U+0430, Cyrillic small letter a ("a"), can look identical to Unicode character U+0061, Latin small letter a, ("a") which is the lowercase "a" used in English. Thus, a phishing email may refer to a URL www.<a>cmeinvestments.com where <a> refers to the Cyrillic small letter a, but the user of a website would not be able to distinguish it from the URL of www.acmeinvestments.com. Several browsers are vulnerable to such masquerading.

There are other ways of tricking a user to go to a website different than that to which one intended to go, including schemes that compromise the domain name system (e.g. a virus could be used to overwrite the hosts file or the browser cache). However, such an attack requires compromising the security of a machine, and is less likely to be used. Examples of attacks of this nature are described in the paragraphs below for completeness. Most commonly, techniques for phishing rely on tricking the user about accessing a different URL, since that can be done by means of a misleading e-mail without sophisticated attacks on the operating system security.

For example, one way that the page can be forged is via an attack on the above-noted step to resolve the protocol to be used to look up the destination page. It is possible to redirect the user to a page on the user's own hard disk by pointing the browser to a "file:/" reference. This kind of redirection can be especially dangerous because it circumvents most browser security mechanisms. The attacker must be able to plant code in the user's file system at a known location (e.g., in the browser cache).

Another way, for example, that the page can be forged is via an attack on the above-noted step to contact the DNS to resolve the destination host. The attacker may "poison" a DNS server to redirect the user to an IP address that is controlled by the attacker instead of forwarding the browser to the requested location. For example, a user could be directed to IP address 10.1.1.1 if the IP address mapping for www.acmeinvestments.com were undermined.

As another example, one way that the page can be forged is via an attack on the above-noted step to connect to the IP address named by the DNS look-up. An IP address take-over can be initiated by redirecting routes or man-in-the-middle attacks where the attacker owns a machine on the path to the actual target of the web page download. In these cases, the attacker can act as a proxy and control and intercept the input and/or output (I/O) from a user's browser.

Yet another way, for example, that the page can be forged is via an attack on the above-noted step to render the page and simultaneously execute any embedded scripts where appropriate. The attacker may not be able to execute any of the attacks noted above and therefore may be forced to conceal the fact that it (the attacker) has redirected the user to the attacker's own forged website by impersonating the look of the forged website and by hiding the evidence that shows the user that he or she is not currently browsing the website that he or she expects to be browsing based on the content viewed in the browser window.

FIG. 1 shows a flow diagram illustrating a method for detecting computer fraud, according to one embodiment of the invention. Step 102 includes obtaining a text version of a candidate destination and a graphical rendering of the candidate destination. A candidate destination is a network address or a Universal Resource Identifier (URI) or a Uniform Resource Locator (URL) to which a portion of a message is directed. A text version of the candidate destination is the rendering of the destination using a textual representation standard such as, for example, ASCII or Unicode. A graphical rendering is the representation of the candidate destination in an image format, e.g. as a gif, jpeg or tiff format. Step 104 includes comparing the text version of the candidate destination and the graphical rendering of the candidate destination with, respectively, a corresponding text version of a stored destination and a corresponding graphical rendering of the stored destination. A stored destination can be a network address, URI or URL which is intended to be protected against fraud and is maintained in a repository at the computer. Such a repository may be a text file, a local database, an XML file, etc. Step 106 includes generating a fraud warning if the graphical rendering of the candidate destination is substantially similar to the graphical rendering of the stored destination while the text version of the candidate destination differs substantially from the corresponding text version of the stored destination. Optionally, the method illustrated in FIG. 1 can also include step 108, identifying a candidate destination page as clean if all of the determined organizations match to a corresponding stored organization identity and/or identification (ID) in the repository and if the stored organization is not too similar to another organization that is ranked as more popular in the repository database. The method illustrated in FIG. 1 can also optionally include step 110, identifying the candidate destination page as "unknown origin" if the visual cues could not be matched to an organization, but for which the candidate destination coincides with the visual URL and whose destination is not a likely phishing destination.

Figure 2:
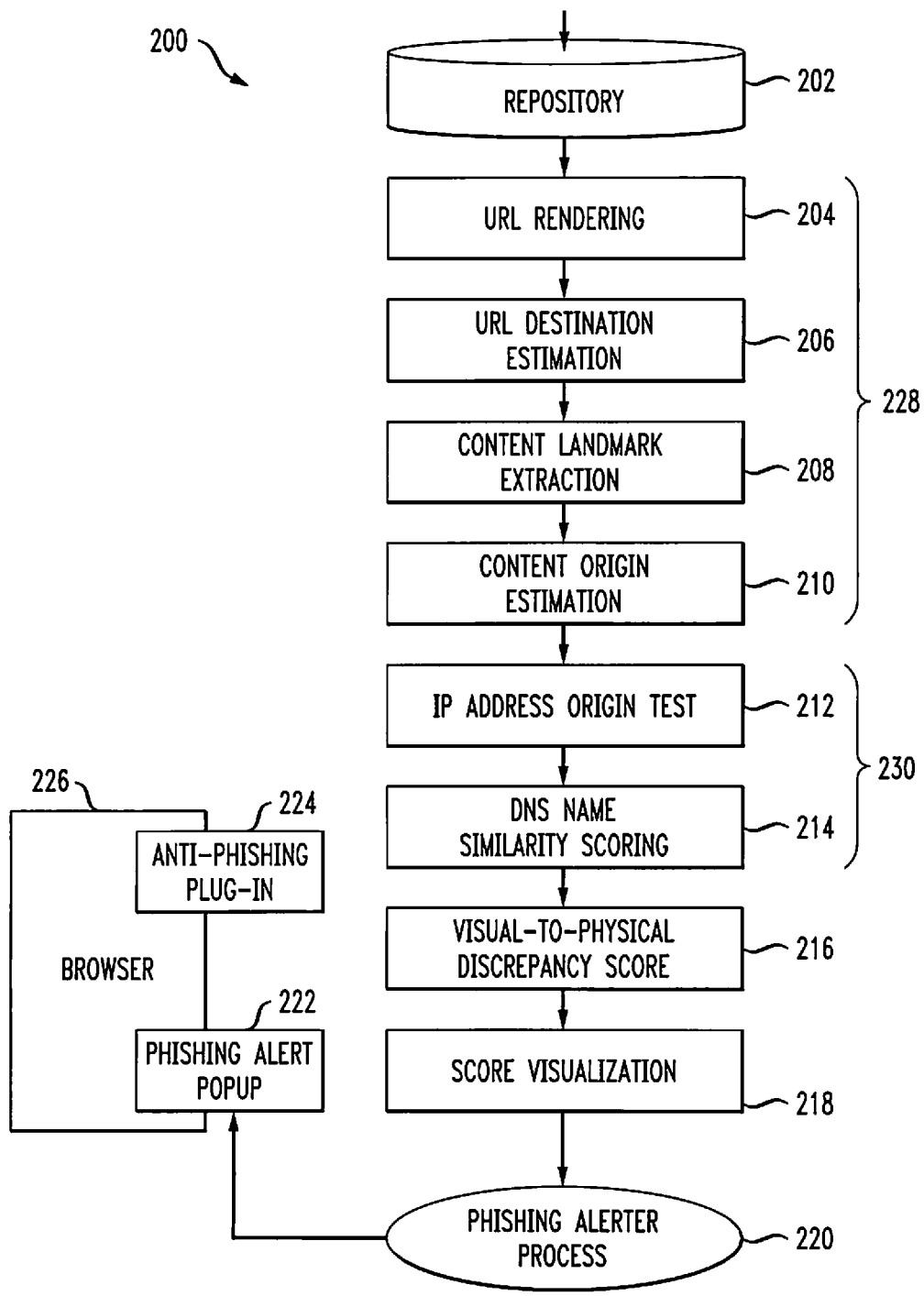
FIG. 2 is a block diagram illustrating an exemplary system that can execute an exemplary method for detecting computer fraud, according to another aspect of the invention.

FIG. 2 shows a block diagram illustrating an exemplary system that can execute an exemplary method for detecting computer fraud, according to one embodiment of the invention. The system 200 comprises components including a database, or repository, 202, which may comprise at least one well-known destination, IP addresses, URL prefixes or patterns, content landmarks (e.g., logos), and IP address ownership records. The system 200 also comprises an anti-phishing plug-in 224, and a browser 226. The system 200 also comprises appropriate software, hardware, or mixed hardware-software modules to execute method steps as described below.

Step 228 comprises a visual analysis phase. Step 228 may include the steps of URL rendering 204, URL destination estimation 206, content landmark extraction 208, and content origin estimation 210. Step 230 comprises a physical analysis. Step 230 may include the steps of an IP address origin test 212, and DNS name similarity scoring 214. Step 216 includes producing a visual-to-physical discrepancy score. Step 218 includes producing score visualization. Step 220 comprises a phishing alerter process, which may include producing a phishing alert pop-up 222 at a randomized location. A randomized location may comprise generating a fraud warning or phishing alert pop-up 222 via a visual prompt displayed to the user in at least one of a window and a status bar external to the browser window associated with the candidate destination, wherein the window is opened in a randomly placed window separate from the browser to prevent overlay attacks by the phishers.

When a website is completely rendered in the browser, a software agent takes a snapshot of the information displayed in the browser window. This snapshot includes the source content comprising, for example, images, location URL, and displayed text. The software agent also takes a screen-shot of the image rendered inside the browser.

One aspect of the invention is to maintain a database of existing known URLs targeted for phishing attacks, and the graphical rendering of those URLs, using a predefined convention. The inventive techniques execute the following steps on each web page that is downloaded or for which the user initiates a check. The techniques include obtaining a text version of a candidate destination and a graphical rendering of the candidate destination, comparing the text version of the candidate destination and the graphical rendering of the candidate destination with, respectively, a corresponding text version of a stored destination and a corresponding graphical rendering of the stored destination, and generating a fraud warning if the graphical rendering of the candidate destination is substantially similar to the graphical rendering of the stored destination while the text version of the candidate destination differs substantially from the corresponding text version of the stored destination.

In one embodiment of the invention, the candidate destination and the stored destination are represented as URLs. The inventive techniques may be automatically executed upon loading a web page associated with the candidate destination. Also, the inventive techniques may be executed by using a test phishing button that is shown to the user in a window or status bar external to the browser window associated with the candidate destination in order to prevent overlaying attacks by phishers. In another aspect of the invention, the step of comparing the text version and the graphical rendering of the candidate destination with the corresponding text version and graphical rendering of the stored destination is performed on a subset of the candidate destination and the stored destination, wherein a subset may comprise, for example, the prefix and/or suffix of a URL.

In one aspect of the invention, the inventive techniques allow for a web page to be downloaded through a browser. Upon successfully downloading a page, but before the page's on Load( ) Java and other scripts execute, the anti-phishing plug-in 224 will extract the URL that is stored in the browser location field. The plug-in 224 allows the page to be fully rendered and extracts the visible browser location by taking a snapshot image of the browser window. The snapshot function is used, preferably, because there are known attacks in which a phishing web site disables the browser toolbar and present its own (e.g. JavaScript version) of the location field to the user.

The plug-in 224 will read the image map of the browser toolbar associated with the candidate destination and determine a character representation of the image map by using an optical character recognition (OCR) algorithm for character recognition. In one aspect of the invention, the inventive techniques include parsing the character representation, and also normalizing the character representation by lowercasing all characters. The inventive techniques can also include generating various derivative versions of the candidate destination through character permutation and substitution based on known optical similarity and identification in a repository 202 containing well-known destination URLs via a search of the repository 202 or database. The inventive techniques record any matches between the well-known destinations and versions of the candidate destinations.

The plug-in 224 will take a snapshot of the web page window associated with the candidate destination, execute OCR on the entire rendered image and store the recognized words into an array. The plug-in 224 performs these actions because phishers can substitute graphical elements for plain text to evade recognition by automated tests.

In another aspect of the invention, the inventive techniques read only the text of the web page associated with the candidate destination into the array. Also, an algorithm computes the word-distribution signature of the web page by extracting a word histogram. Such inventive techniques compare the extracted word histogram to the histograms of well-known destination web pages that are recorded in the database or repository, record any matches between the extracted word histogram and histograms of well-known destination web pages, and sort the matches by percentage overlap in the word histogram. In another aspect of the invention, the inventive techniques extract the estimated sources based on the closest matches in content overlap on the basis of text analysis, and record the sources as potential origins for the candidate destination.

If the candidate web page contains images, the inventive techniques can convert the images to a common graphics format (e.g. graphic interchange format (GIF)), generate image fingerprints for the images, compare the image fingerprints against signatures of well-known logos, and record any matches between the image fingerprints and the signatures of well-known logos. Preferably, logo fingerprints in the database or repository contain fingerprints of the same corporate logo rendered at a variety of different resolutions to prevent pixelization effects from hampering logo identification.

The plug-in 224 determines the effective IP address that is mapped by the candidate destination. The inventive techniques determine the effecting owning organization for the effective IP address from its repository 202 or by using secondary databases such as, for example, "whois." The whois service is described in Internet Request for Comments 954, authored by Harrenstein et al in 1985, and available at URL http://www.rfc-archive.org/getrfc.php?rfc=954, and is widely deployed in the Internet. In another aspect of the invention, the inventive techniques check the candidate destination for typical phishing attack signs, e.g., long strings that overflow the location window, locations that have a high likelihood of phishing, or only subtle differences to well-known URL names. Also, the inventive techniques determine the ownership of the DNS domain that is identified in the candidate destination.

In another aspect of the invention, the inventive techniques compute a phishing score for the candidate destination. The techniques identify a candidate destination page as clean if all of the determined organizations match to a corresponding stored organization identity and/or identification (ID) in the repository 202 and if the stored organization is not too similar to another organization that is ranked as more popular in the repository database 202.

In another aspect of the invention, if a candidate destination page has conflicting visual cues (e.g. organization ID=X) and physical organization (ID=Y), the inventive techniques produce a window 222 that alerts the user to the potential of phishing and shows the results of visual cue checking and those of the physical trace back. The techniques generate a fraud warning 222 via a visual prompt displayed to the user in at least one of a window and a status bar external to the browser window associated with the candidate destination. The window 222 is opened in a randomly placed window separate from the browser to prevent overlay attacks by the phishers.

In yet another aspect of the invention, the inventive techniques identify the candidate destination page as "unknown origin" if the visual cues could not be matched to an organization, but for which the candidate destination coincides with the visual URL and whose destination is not a likely phishing destination. Also, the techniques identify the candidate destination page as "safe" if the visual cues of the pages map to a well-known target, and the physical organization determination obtained the same organization ID.

The inventive techniques, in another aspect of the invention, determine the location of the candidate destination URL in the browser toolbar. The user may collaborate with the software agent in order to establish the location to the URL display relative to the browser window. The software agent may include OCR software to locate the location of the ADDRESS bar. Also, the software agent may include a test suite that redirects the browser to a list of distinct URLs which fill out the entire location window in the browser toolbar. The content to be displayed at those distinct URLs is identical so that only the URL will change in the entire browser window. By using a combination of all letters and regional character codes in the set of tested URLs, it is possible to determine the exact height of the text. This test can be automated on every restart of the browser. An agent can be installed as a browser plug-in that captures the current browser location, runs the URL location test, and restores the original browser location on every resizing for the browser window.

In other aspects of the invention, the inventive techniques may be performed by a software agent, in a web browser, or in an e-mail client.

Figure 3:
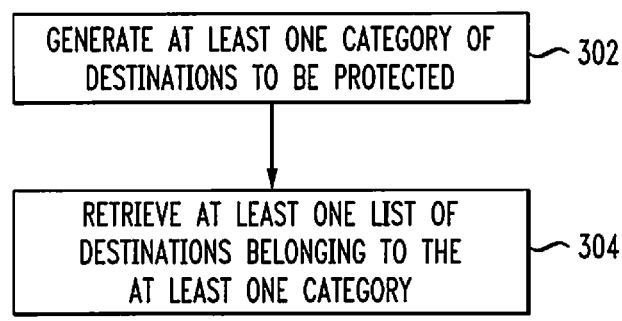
FIG. 3 is a flow diagram illustrating an exemplary method for generating a database of destinations to be protected against computer fraud, according to yet another aspect of the invention.

FIG. 3 shows a flow diagram illustrating a method for generating a database of destinations to be protected against computer fraud, according to one embodiment of the invention. Step 302 includes generating at least one category of destinations to be protected. Step 304 includes retrieving at least one list of destinations belonging to the at least one category. In an aspect of the invention, the step of retrieving at least one list of destinations belonging to the at least one category may include obtaining a first list of destinations and a second list of destinations, and merging the first list of destinations and the second list of destinations. In another aspect of the invention, the step of retrieving at least one list of destinations belonging to the at least one category may include accessing at least one of an Internet search engine and an Internet indexing service.

A variety of techniques, utilizing dedicated hardware, general purpose processors, firmware, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 4:
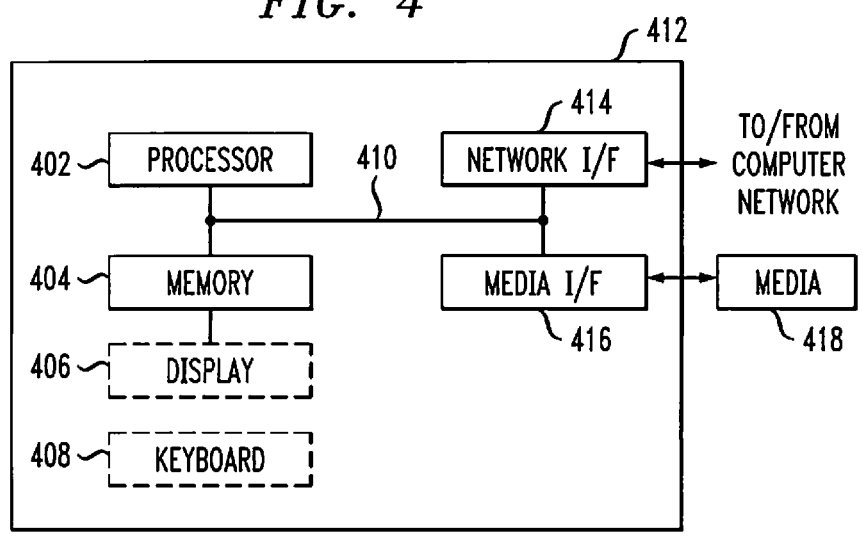
FIG. 4 is a system diagram of an exemplary computer system on which at least one embodiment of the present invention can be implemented.

At present, it is believed that the preferred implementation will make substantial use of software running on a general purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input and/or output interface" as used herein, is intended to include, for example, one or more mechanisms for inputting data to the processing unit (e.g., mouse), and one or more mechanisms for providing results associated with the processing unit (e.g., printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 404), magnetic tape, a removable computer diskette (e.g. media 418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:

generating at least one category of destinations to be protected;

retrieving (i) at least one list of known destinations belonging to said at least one category and (ii) contents specified at each uniform resource locator associated with a destination identified in the at least one list of known destinations belonging to said at least one category, wherein said contents comprise (a) a textual representation of the contents of the destination, (b) multiple instances of a graphical rendering of the contents of the destination, wherein each instance of the graphical rendering is rendered at a distinct level of resolution to encompass one or more pixelization effects, and (c) ownership information associated with the destination;

comparing both (i) a textual representation of contents of a candidate destination and (ii) a graphical rendering of the candidate destination with the contents specified at each uniform resource locator associated with each destination identified in the at least one list of known destinations belonging to said at least one category;

verifying the candidate destination as belonging to said at least one category if both (i) the graphical rendering of the candidate destination and (ii) the textual representation of the contents of the candidate destination share a given level of similarity with contents associated with a destination identified in the at least one list of known destinations; and generating a warning upon the verification that (i) the graphical rendering of the candidate destination shares the given level of similarity with contents associated with a destination identified in the at least one list of known destinations but (ii) the textual representation of the contents of the candidate destination does not share the given level of similarity with contents associated with a destination identified in the at least one list of known destinations;

wherein at least one of said steps is carried out by a computing device.

2. The method according to claim 1, wherein the step of retrieving at least one list of destinations belonging to said at least one category comprises the steps of:

obtaining a first list of destinations and a second list of destinations; and merging said first list of destinations and said second list of destinations.

3. The method according to claim 1, wherein the step of retrieving at least one list of destinations belonging to said at least one category comprises the step of:

accessing at least one of an Internet search engine and an Internet indexing service.

4. A computer program product residing on a non-transitory computer readable storage medium having a plurality of instructions stored thereon which, when executed by a processor, cause the processor to perform operations comprising:

generating at least one category of destinations to be protected;

retrieving (i) at least one list of known destinations belonging to said at least one category and (ii) contents specified at each uniform resource locator associated with a destination identified in the at least one list of known destinations belonging to said at least one category, wherein said contents comprise (a) a textual representation of the contents of the destination, (b) multiple instances of a graphical rendering of the contents of the destination, wherein each instance of the graphical rendering is rendered at a distinct level of resolution to encompass one or more pixelization effects, and (c) ownership information associated with the destination;

comparing both (i) a textual representation of contents of a candidate destination and (ii) a graphical rendering of the candidate destination with the contents specified at each uniform resource locator associated with each destination identified in the at least one list of known destinations belonging to said at least one category;

verifying the candidate destination as belonging to said at least one category if both (i) the graphical rendering of the candidate destination and (ii) the textual representation of the contents of the candidate destination share a given level of similarity with contents associated with a destination identified in the at least one list of known destinations; and generating a warning upon the verification that (i) the graphical rendering of the candidate destination shares the given level of similarity with contents associated with a destination identified in the at least one list of known destinations but (ii) the textual representation of the contents of the candidate destination does not share the given level of similarity with contents associated with a destination identified in the at least one list of known destinations.

5. The computer program product of claim 4, wherein:

retrieving at least one list of destinations belonging to said at least one category comprises the steps of:

obtaining a first list of destinations and a second list of destinations; and merging said first list of destinations and said second list of destinations.

* * * * *